(12) United States Patent
Bradley et al.

(10) Patent No.: US 8,641,628 B2
(45) Date of Patent: *Feb. 4, 2014

(54) APERTURE SYNTHESIS USING CMUTS

(75) Inventors: Charles E. Bradley, Burlingame, CA (US); Christopher M. Daft, Sunnyvale, CA (US); Paul A. Wagner, San Carlos, CA (US); Satchi Panda, Fremont, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1453 days.

This patent is subject to a terminal disclaimer.

(21) Appl. No.: 11/904,454

(22) Filed: Sep. 26, 2007

(65) Prior Publication Data

US 2009/0079299 A1 Mar. 26, 2009

(51) Int. Cl.
*A61B 8/00* (2006.01)

(52) U.S. Cl.
USPC .............................. 600/459; 600/437; 600/443

(58) Field of Classification Search
USPC .......... 600/437, 443, 459; 310/317, 318, 334, 310/364; 381/190, 191; 73/602, 621, 642
See application file for complete search history.

(56) References Cited

U.S. PATENT DOCUMENTS

| | | | | |
|---|---|---|---|---|
| 5,186,175 | A | * | 2/1993 | Hirama et al. ................ 600/447 |
| 5,623,928 | A | * | 4/1997 | Wright et al. ................ 600/447 |
| 5,851,187 | A | * | 12/1998 | Thomas et al. ............... 600/447 |
| 6,048,315 | A | | 4/2000 | Chiao et al. |
| 7,780,597 | B2 | * | 8/2010 | Panda et al. ................... 600/437 |
| 2005/0119575 | A1 | | 6/2005 | Ladabaum et al. |
| 2005/0215909 | A1 | * | 9/2005 | Barnes ......................... 600/459 |
| 2005/0243812 | A1 | | 11/2005 | Phelps |
| 2006/0173342 | A1 | * | 8/2006 | Panda et al. ................... 600/459 |
| 2007/0242567 | A1 | * | 10/2007 | Daft et al. ..................... 367/140 |

FOREIGN PATENT DOCUMENTS

| EP | 1 768 101 A | 3/2007 |
|---|---|---|
| EP | 1 795 917 A | 6/2007 |

OTHER PUBLICATIONS

Daft, C. et al, "cMUTs and Electronics for 2D and 3D Imaging: Monolithic Integration, In-handle Chip Sets and System Implications", Ultrasonics Symposium, 2005 IEEE Rotterdam, The Netherlands, Sep. 18-21, 2005, vol. 1, Sep. 18, 2005, pp. 469-474, XP010899007.

Wagner, P. et al, "5G-1 Two Approaches to Electronically Scanned 3D Imaging Using cMUTs", Ultrasonics Symposium, 2006. IEEE PI, Oct. 1, 2006, pp. 685-688, XP031076389.

Fisher, R. et al, "Reconfigurable Arrays for Portable Ultrasound", Ultrasonics Symposium, 2005 IEEE Rotterdam, The Netherlands, Sep. 18-21, 2005, vol. 1, Sep. 18, 2005, pp. 495-499, XP010899013.

PCT International Search Report, 4 pages.

\* cited by examiner

*Primary Examiner* — Parikha Mehta

(57) ABSTRACT

An ultrasound imaging system may use a capacitive membrane or electrostrictive ultrasound transducer to realize isotropic volumetric imaging with bias-line element selection and a variety of aperture synthesis techniques. Two dimensional beam formation may be performed by using a beamformer to focus along one dimension, and then perform a second round of "off-line" or "retrospective" beam formation along the other direction.

22 Claims, 8 Drawing Sheets

APERTURE SYNTHESIS USING CMUTS

BACKGROUND

As the diagnostic ultrasound industry moves from one dimensional (1D) ultrasound arrays for two dimensional (2D) imaging towards 2D ultrasound arrays for volumetric imaging, there may be problems of scale. For example, if a conventional 1D array has N=200 elements, the corresponding 2D array would have N×N=40,000 elements. Ultrasound systems have traditionally had a number of channels that roughly corresponds to the number of elements in the probe. However, the cost of system channels is such that such a correspondence is not practical for 2D arrays.

The 2D ultrasound imaging may utilize a capacitive membrane, micromachined, or microfabricated ultrasound transducer (cMUT) or electrostrictive materials transducer. Capacitive transducers (such as cMUT's) and transducers made from electrostrictive materials may be similar in utilizing the application of a direct current (DC) bias voltage for activation. The biasing allows for the performance of a transduction operation. cMUTs may be formed from semiconductor material or from other materials. A plurality of membranes or other flexible structures with electrodes transduce between acoustic and electrical energies. Groups of the membranes operate as different elements. Various arrangements of elements may be provided on the cMUT, such as multi- or two-dimensional arrays of elements. To operate a cMUT, the membranes are biased by a DC voltage. Alternating signals are applied to the elements to generate acoustic energy. Acoustic energy received by the elements is converted into alternating electrical signals.

BRIEF SUMMARY

By way of introduction, the preferred embodiments described below include systems and methods for ultrasound imaging with a capacitive micromachined ultrasound transducer (cMUT) or electrostrictive ultrasound transducer capacitive. Isotropic volumetric imaging may be realized with bias-line element selection and a variety of aperture synthesis techniques. Two dimensional beamformation may be performed by using a beamformer to focus along one dimension, and then perform a second round of "off-line" or "retrospective" beam formation along the other direction.

In a first aspect, a system is provided for volumetric ultrasound imaging that includes a transducer that includes elements that are activated by a bias voltage. A bias generator is coupled with the transducer and generates a bias signal establishing a first bias pattern of the elements and generates a bias signal for establishing a second bias pattern of the elements. A beamformer is coupled with the transducer, and the transducer transmits and receives ultrasound data based on the first bias pattern and transmits and receives ultrasound data based on the second bias pattern. An image is generated based on a combination of the ultrasound data from the first bias pattern and the ultrasound data from the second bias pattern.

In a second aspect, a method for ultrasound imaging with an ultrasound transducer responsive to a bias for transduction is provided. Transmissions from the ultrasound transducer occur with a first bias pattern and with a second bias pattern. The ultrasound transducer receives data in response to the transmitting, from the first bias pattern and from the second bias pattern. A signal resulting from the transmitting and receiving of the first bias pattern is combined with a signal resulting from the transmitting and receiving of the second bias pattern.

In a third aspect, a method for ultrasound imaging using an electrostrictive material responsive to biasing is provided. A first bias pattern of elements on the material is activated. First ultrasound imaged data is transmitted and received with the first bias pattern. A second bias pattern of elements on the material is activated. Second ultrasound imaged data is transmitted and received with the second bias pattern. The first ultrasound image data and the second ultrasound image data are combined and an image is formed as a function of the combination.

In a fourth aspect, a system for volumetric ultrasound imaging is provided that includes a transducer including elements that are activated by a bias voltage. A beamformer is coupled with the transducer and operable to perform transmit and receive functions. A synthesizer is coupled with the transducer. The synthesizer is operable to perform aperture synthesis on the transmit and receive functions. A first transmit and receive function is performed on elements that are biased according to a first bias pattern and a second transmit and receive function is performed on elements that are biased according to a second bias pattern.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

U.S. Patent App. Publication No. 2007/0079658, entitled "ROTATING APERTURE FOR ULTRASOUND IMAGING WITH A CAPACITIVE MEMBRANE OR ELECTROSTRICTIVE ULTRASOUND TRANSDUCER," which is hereby incorporated by reference, describes a probe design that utilizes a property of cMUT transducers and allows the number of electrical connections to the transducer to be 2×N instead of N×N. Alternatively, the electrical connections may be M×N rather than N×N which results in M×N elements. The present disclosure relates to the use of cMUT transducers and electrostrictive transducers, such as cMUT probes with M×N electrical connections in one embodiment. Rather than requiring N×N beamformer channels, N beamformer channels may be utilized with a serial, two-stage beamformation process. The process may enable isotropic volumetric imaging.

Figure 1:
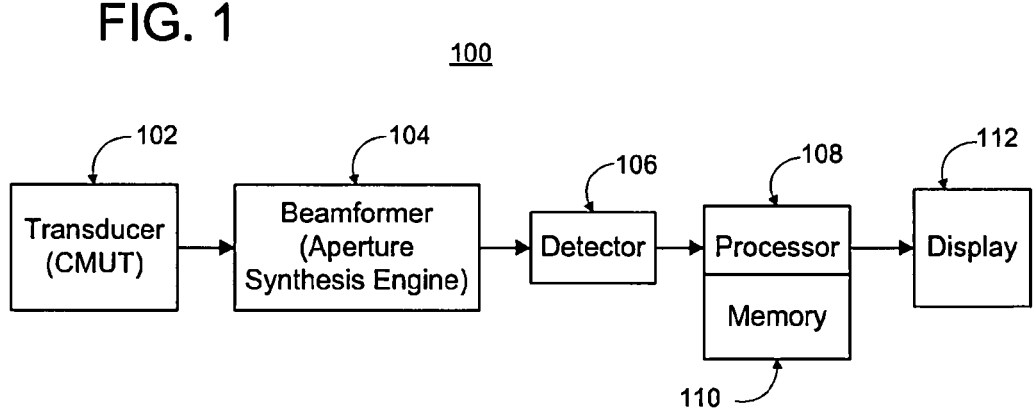
FIG. 1 is a diagram of a system for ultrasound imaging.

FIG. 1 shows the ultrasound system 100 for generating images from ultrasound data. The ultrasound system 100 includes a transducer 102, a beamformer 104, a detector 106, a processor 108 with a memory 110, and a display 112. Additional, different, or fewer components may be provided. For example, the processor 108 may be either a Computer Processing Unit (CPU) or a Graphics Procession Unit (GPU), and the memory 110 may be combined with the processor 108 as a single unit. The processor 108 configures the system 100, and processes ultrasound data or performs other functions. In an alternative embodiment, the system 100 is a workstation or computer operable on ultrasound data obtained with another device.

The transducer 102 may comprise an array of elements, such as a two dimensional (2D) array. The array of elements may be configured for linear, curvilinear, sector, Vector®, or other imaging configurations. In one embodiment, the transducer 102 may include an electrostrictive material that comprises elements that are activated by a DC bias voltage. For example, the transducer 102 may be a capacitive micromachined ultrasonic transducer (cMUT) or a structure with an electrostrictive material. In particular, a cMUT is an array of elements used to generate and to detect ultrasonic waves. A cMUT device generally comprises a cell of a top electrode disposed on or within a membrane, a bottom electrode disposed on or in a substrate, and a cavity between the membrane and the bottom electrode, making the cMUT a parallel plate capacitor having two electrodes. The top electrode (e.g., metallized membrane) is movable, and the bottom electrode on or in the substrate may be fixed. Between the electrodes is a dielectric medium (either vacuum or air gap).

cMUT devices comprise groups of cells in elements that react to an applied DC bias for converting acoustical energy to electrical energy and vice versa. The cells operate together to transform mechanical energy into electrical energy and vice versa. Because cMUTs are typically very small and have both mechanical and electrical parts, they may be referred to as micro-electronic mechanical systems ("MEMS") devices. Conventional cMUTs generally have a ground electrode and a hot electrode. The hot electrode can be used to transmit and receive ultrasonic acoustical waves during ultrasonic imaging. Due to the differing characteristics associated with transmitting and receiving ultrasonic waves, conventional cMUT hot electrodes are commonly optimized to receive or transmit ultrasonic waves with high sensitivity, possibly compromising the maximum transmit power.

A cMUT may be operated either in a transmitter mode or in a receiver mode. A transmitter mode of a cMUT may be used to generate ultrasonic waves and a receiver mode may detect the ultrasonic waves. When a static voltage is placed between the two electrodes, the membrane is attracted to the substrate by Coulombic forces. When an AC voltage is superimposed on top of the DC potential, the membrane will move in response to the signal and an ultrasonic wave is generated and launched into the environment. If under DC bias, an ultrasonic wave approaches the membrane, the membrane will vibrate and an output AC voltage can be measured from the device electrodes. The applied DC bias supplies the charge that is modulated by the membrane movement to create an AC signal.

Figure 2:
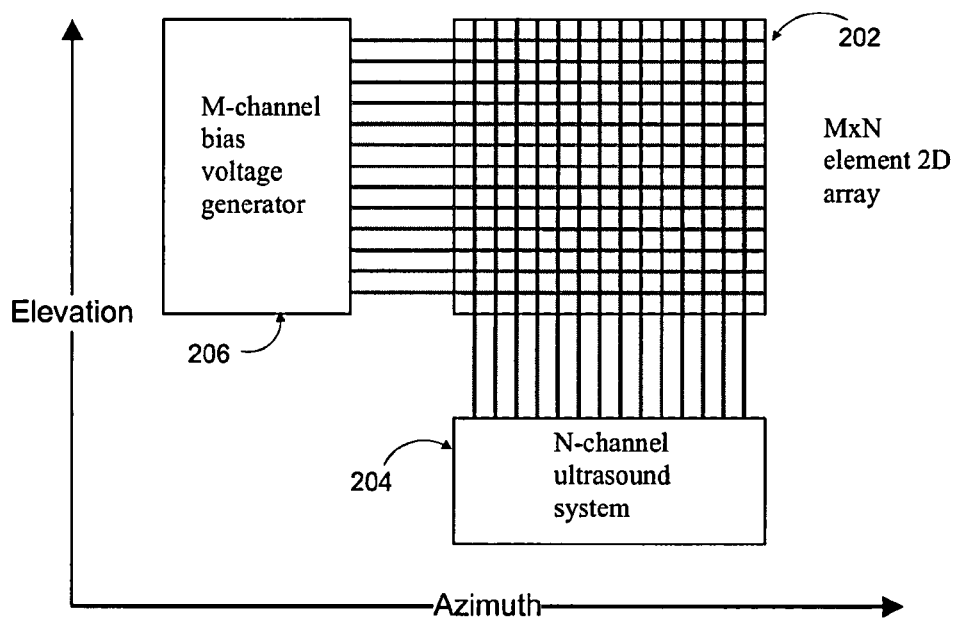
FIG. 2 is an illustration of a 2D array.

The transducer 102 may be the transducer as described in U.S. Patent App. Publication No. 2007/0079658, entitled "ROTATING APERTURE FOR ULTRASOUND IMAGING WITH A CAPACITIVE MEMBRANE OR ELECTROSTRICTIVE ULTRASOUND TRANSDUCER," which is hereby incorporated by reference. In particular, FIG. 2 illustrates one embodiment of a transducer. The design is based on the utilization of a particular feature of cMUT-type transduction. While piezoelectric transducers use the application of an AC signal to radiate, cMUT's use an AC signal and a DC bias. The 2D array shown in FIG. 2 has M rows and N columns for a total of M×N elements. M and N are integers greater than 1 and are equal or not equal. The bias voltage is provided by a bias voltage generator with M channels. Each of the M lines carrying the bias voltage is oriented horizontally and biases every element in it's row. Each of the N AC signal lines is, by contrast, oriented vertically and carries it's signal to every element in it's column. In order to excite or activate the $(m,n)^{th}$ element, the bias voltage is applied to the $m^{th}$ bias line and the AC signal to the nth signal line. All elements along the $m^{th}$ row are biased "on," and all elements along the nth column are supplied with an AC signal. However, the only element that is both biased on and supplied with an AC signal is the $(m,n)^{th}$ element. Accordingly, this is the element that radiates. More than one element may be radiate at a given time.

As described, there may not be an independent system channel for every element. Although independent access to all elements in a 2D array is provided, there may not be simultaneous access. Accordingly, beamformation techniques may be different than those used for tradition ultrasound imaging. In one embodiment, the beamformation technique described herein may make use of the above described transducer architecture so that isometric, volumetric ultrasound imaging with 2D arrays is more practical.

Referring back to FIG. 1, the beamformer 104 connects with the transducer 102 for generating acoustic beams along an acoustic grid. Acoustic data is collected by rocking, rotating, or sliding the transducers with mechanical movement or using electronic beam steering. The beamformer 104 may also be referred to as an aperture synthesis engine for enabling 2D beam formation across thousands of elements by synthesizing an aperture from multiple reception events. Alternatively, a separate processor and memory are provided for synthesizing the aperture from signals prior to or after beamformation. In one embodiment, the technique may be referred to as Elevation Aperture Synthesis (EAS) and makes use of conventional ultrasound beamformation along one axis and an aperture synthesis technique along the other. These two operations may be performed serially for providing focused imaging across both axes. One example aperture synthesis is described in "ULTRASOUND IMAGING TRANSDUCER ARRAY FOR SYNTHETIC APERTURE," U.S. Pat. Pub. 2007/0167752, the entire disclosure of which is hereby incorporated by reference.

FIG. 2 illustrates a two dimensional (2D) array 202 with M rows, each attached to an independent channel of an M-channel bias voltage generator 206, and N rows, each attached to an independent channel of an N-channel ultrasound system 204. The bias voltage generator 206 is a switchable DC voltage source. When a bias voltage is switched "on" and applied to the transducer, there may be transient current flow, but in the steady biased state, there may be minimal leakage current. When the bias voltage generator 206 is turned "off," there is substantially no current. When the bias voltage generator 206 is turned "on," there is a predetermined DC current value.

The bias generator 206 is configured to generate a certain pattern of bias voltages, and the ultrasound system 204 is triggered to transmit and receive as in conventional ultrasound imaging for conventional 1D ultrasound arrays. The bias generator 206 may be a high voltage FET network connected with a voltage source. Different transistors, switches, voltage dividers, transformers, voltage generators or other devices may be used. Any now known or later developed bias generator 206 may be used. In one embodiment, the bias generator 206 generates alternating waveforms at a frequency less than the alternating frequency of operation of the transducer 102 (ultrasound frequency) to act substantially as a DC bias. A bias voltage frequency of less than or equal to ⅓ the frequency of the alternating signal may be "substantially DC." For example, a 500 KHz waveform is generated. By switching at about 500 KHz, a sinusoidal waveform may be used to gradually increase and decrease the bias voltage between transmit and receive events. The gradual transition, such as over one or two microseconds, may avoid generation of undesired acoustic transmissions. Any unwanted sound generated during the transition may be filtered out from the received signal.

The bias generator 206 is operable to generate at least two different bias levels, such as a zero bias and a non-zero bias or negative and positive biases selected for a desired sensitivity of the transducer 102, such as 10-120 volts. A greater number of bias levels may be used, such as five or seven bias levels. Different bias levels are applied to different electrodes (not shown) forming an apodized aperture for use during transmit and/or receive events. On receive, the bias levels and/or Fresnel bias pattern may fluctuate over the duration of the receive event in a way that dynamically focuses based on phase.

A focused beam of ultrasound is transmitted along a direction. A standard focusing beamformation operation is performed on the resultant received signals. The resultant stream of ultrasound beam data is then stored for later processing. The pattern of bias voltages may be updated and the process is repeated. In one embodiment, the process repeats L times, with each L being associated generally with different bias configurations. Once completed, the result includes L sets of ultrasound beam data. Bias control is further described in "MICROFABRICATED ULTRASONIC TRANSDUCER ARRAY FOR 3-D IMAGING AND METHOD OF OPERATING THE SAME," U.S. Pat. Pub. No. 2005/0119575, the entire disclosure of which is hereby incorporated by reference.

The beam data is focused ultrasound beam data that is focused along one dimension. The ultrasound system channels may correspond to the columns of the array 202. Accordingly, the focusing performed by the ultrasound system 204 is across the columns of the array 202. This dimension may be referred to as azimuth as shown in FIG. 2. The opposing dimension may be referred to as elevation.

Figure 3:
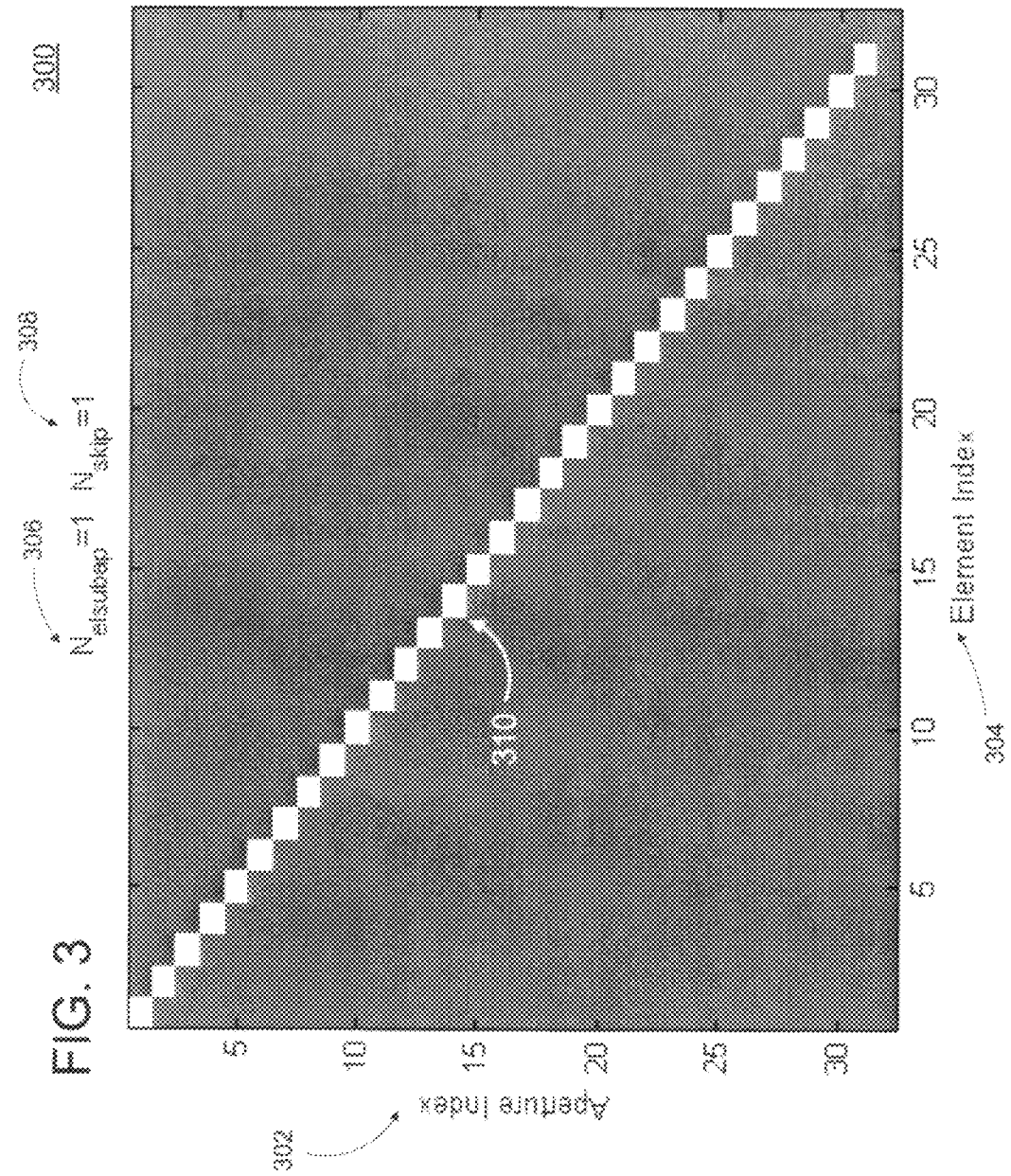
FIG. 3 is a graphical representation of one embodiment of a bias pattern.

FIG. 3 illustrates an embodiment of a set of bias patterns. The transducer has a number of rows, each connected to a channel or line of a bias voltage generator. As shown, the bias lines are identified by the aperture index 302. Each of the rows represented by the aperture index 302 may be biased on or biased off. The aperture index 302 represents each of the different bias lines and the status of those bias lines establishes a bias pattern. The aperture index 302 identifies the available apertures for each of the elements in the element index 304. Each of the elements from the element index 304 may be biased on or off by the corresponding rows of the aperture index 302.

In the first pattern of the bias lines, all bias lines are off (at approximately 0 volts in one example) except for the first of the bias lines in the aperture index 302. The first bias line is turned on (at a voltage, such as 100 volts in one example). In the second pattern, where the aperture index 302 equals two, all bias lines are off except the second one. In the third pattern, all bias lines are off except the third, and so on. Each row on this plot represents the pattern of bias voltages applied to the transducer. As the plot shows L such rows, there are L different bias patterns applied to the transducer in sequence. Accordingly, the ultrasound system performs L acquisitions of beam data. As one example, element 310 is shown as being biased on. Each of the white boxes may be referred to as element 310 and the white boxes represent the elements that biased on. As shown, each row may be the bias pattern for one tx/rx event. For the set of bias configurations shown in FIG. 3, during the first tx/rx event, bias line 1 is biased on. In the second tx/rx event, bias line 2 is biased on.

A resultant set of beam data is produced from the bias patterns. As shown in FIG. 3, in each bias state, a single bias line is turned on. In particular, a single element is biased on at a time as evidenced by $N_{elsubap}=1$ (306). $N_{elsubap}$ may be the number of elements in each "sub-aperture," such as the number of bias lines turned on for each tx/rx event. $N_{skip}$ may be how far that set of bias lines (i.e., sub-aperture) translates with each tx/rx event. As shown in FIG. 3, $N_{elsubap}=1$ and $N_{skip}=1$, so for any tx/rx event, there is a single bias line turned on, and with subsequent tx/rx events that bias group (in this case, a single bias line) translates across the aperture with increments of one. The Tx/Rx bias patterns may have an effective width greater than or equal to the $N_{skip}$ skip size between the bias patterns.

In other words, one element row is biased on at a time. In addition, the progression of element rows moves one-by-one to the next element row as evidenced by $N_{skip}=1$ (308). Accordingly, a single row of elements is biased on and will radiate an acoustic pulse during the transmit cycle and be active to receive the backscattered ultrasound during the receive cycle. As transducer elements are on the same scale as the acoustic wavelength being used for imaging, the single row of elements will generate a broad, omnidirectional sound field that will spread cylindrically in elevation as it propagates away from the row of elements. Likewise, the sensitivity pattern on receive will be broad, as well as the pattern of round-trip sensitivity.

As shown in FIG. 3, each bias pattern in the set of M bias patterns includes a single bias line turned on. Each associated pattern of the round-trip sensitivity is therefore similar except for a lateral translation. The array is a 2D array, with an elevation direction and azimuth direction. The received data may be focused by beamformation in the azimuth direction. The pattern of round-trip sensitivity may be analogous to the single-element response of a 1D (elevation only) array. That particular set of bias patterns may provide serially transmitting and receiving on each element of the (elevation-only) array. This is analogous to the transmit-receive arrangement used in "side-scanning" sonar for oceanic sonar imaging. In side-scanning sonar, the transducer is a single transmitter-receiver towed through the ocean. As it is towed, it transmits and receives, transmits and receives, each time from a different location. During each such transmit-receive cycle, the resultant data stream is stored. This results in a set of data streams that is analyzed with a beamformation process commonly known as aperture synthesis. This process serves to retrospectively focus the round-trip "single-element" data to result in a focused image.

The aperture synthesis approach may be used to focus the round-trip data from the 2D array. The data is already focused in the azimuth direction by the first-round of beamformation performed by the ultrasound system. The second round of beamformation serves to focus across the apertures in the elevation direction. The result is an image that is focused in both azimuth and elevation directions for a synthesized aperture. The image may be an isometric and volumetric ultrasound image.

As described, FIG. 3 relates to a single bias line pattern, but the radiation from a single row of elements may be overly broad. This breadth may be sufficient from the standpoint of lateral resolution, but may be insufficient from the standpoint of SNR. Further, the resultant dataset may be undersampled given conventional array element sizes in terms of lateral spatial frequency, and may be subject to grating lobes. Alternatively, different bias patterns may be used to achieve differing results. For example, rather than biasing "on" a single row of elements, the bias may be over a contiguous group or set of elements, which increases the effective element size. The increase in the effective element size may reduce the degree to which the radiated acoustic field spreads laterally, which may improve SNR and reduce the amplitude of the grating lobes.

Figure 4:
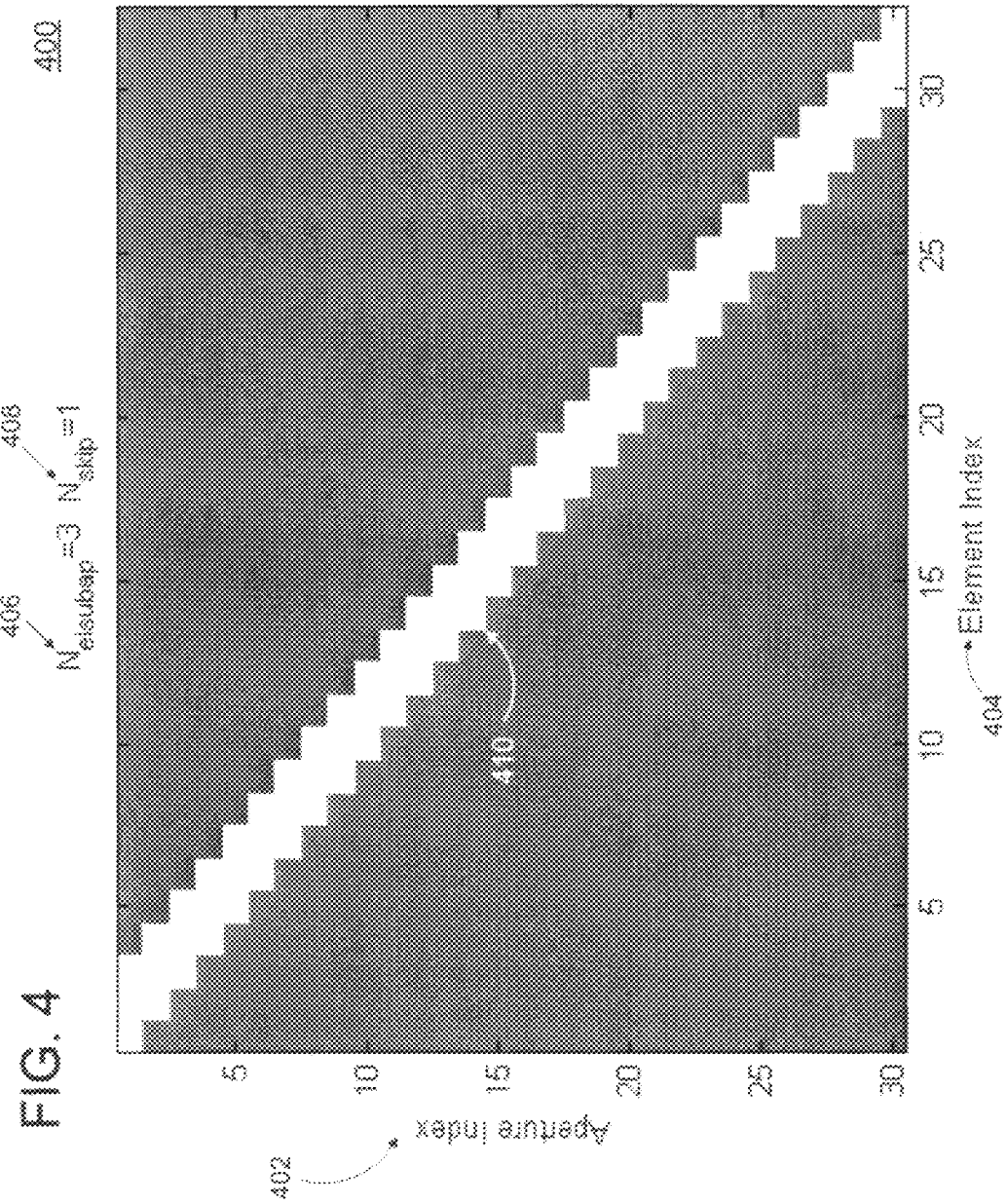
FIG. 4 is a graphical representation of an alternative embodiment of a bias pattern.

FIG. 4 illustrates an alternative bias line pattern. As shown, each bias pattern comprises a group of three neighboring bias lines biased on, and this group translates by one or more elevationally spaced element (row) from pattern to pattern. The transducer has a number of rows, each connected to a channel or line of a bias voltage generator. As shown, the bias lines are identified by the aperture index 402. The aperture index 402 identifies the available apertures for each of the elements in the element index 404. Each of the elements from the element index 404 may be biased on or off by the corresponding rows of the aperture index 402. For example, the elements 410 are biased on. The elements correspond to three rows of elements. For the bias configuration shown in FIG. 4, $N_{elsubap}=3$ and $N_{skip}=1$, so for each tx/rx event, there are three neighboring bias lines turned on, and in subsequent tx/rx events that bias group translates by one. In particular, three element rows at a time are biased on at a time as evidenced by $N_{elsubap}=3$ (406). The progression of elements moves one-by-one to the next element as evidenced by $N_{skip}=1$ (408). In other words, the first element row and the next two element rows ($2^{nd}$ and $3^{rd}$ rows of elements) are biased on, and because $N_{skip}$ 408=1, the second element row and the next two element rows ($3^{rd}$ and $4^{th}$ rows of elements) are biased on next. The bias pattern continues through the remaining N elements, by increasing one element row at a time. For the set of bias configurations shown in FIG. 4, during the first tx/rx event, bias lines 1, 2 and 3 are biased on. In the second tx/rx event, bias lines 2, 3 and 4 are biased on.

The aperture synthesis processing may be described as a delay and sum beamformation process. If $x_m$ represents the position of the "center of mass" of the element group that is biased on in the $m^{th}$ bias pattern, and $(x,z)$ represents the coordinates of a point in the image, then the delay that is applied to the data may be given by $t=2[(x_m-x)^2+z^2]^{(1/2)}/c_0$, where $c_0$ is the speed of sound. The delay may act to align the signals to improve the coherent gain in the beamsum and the lateral resolution. While the delay may represent an improved coherent focusing at all depths, a depth-independent delay may reduce computational requirements (e.g. fixed-focus beamformation). In one embodiment, the sum may be a uniformly weighted sum. Alternatively, a non-uniform weighting may be applied to the signals prior to the sum to improve sidelobe structure. In other words, the beamformation may include apodization as described below with respect to FIG. 5. This apodization may itself be static, for computational simplicity, or alternatively, may vary for improved sidelobe control with range.

Other variants of beamformation may be possible. For example, incoherent beamformation or partially-coherent beamformation may be utilized. In incoherent beamformation, the RF beam data is amplitude detected prior to the beam sum. In partially coherent beamformation, the beamformation operation is applied to the same data set several times with different apodization, and the resultant set of images are combined incoherently.

Figure 5:
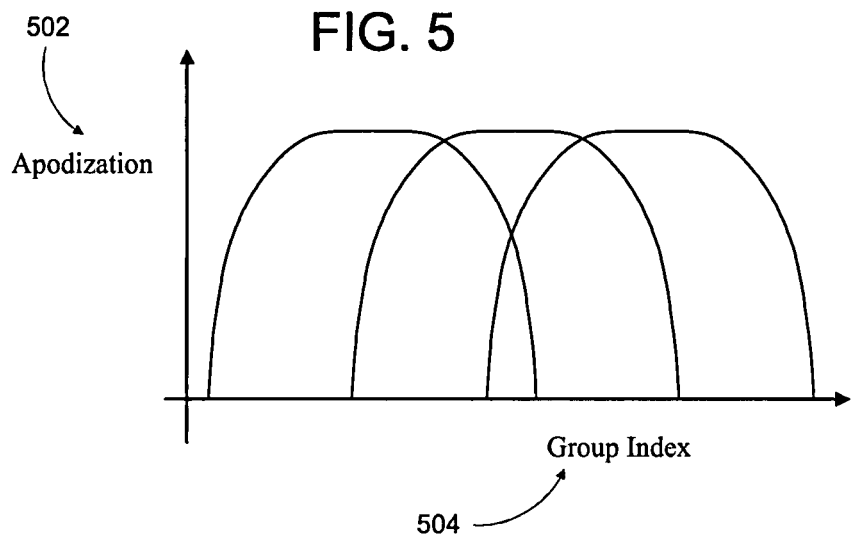
FIG. 5 is a graphical representation of an example apodization function.

For example, a set of data may be acquired and operated on with the synthetic aperture beamformer three times with a set of apodization functions such as those shown in FIG. 5. The apodization 502 is shown on the y-axis with the group index 504 shown as the x-axis. The apodization functions may change the input intensity profile of the data to improve the dynamic range of the data. Each of the three apodization functions may emphasize the data from a different part of the array. When the resultant apodized datasets are beamformed, the beamformation may be effectively controlled.

In other words, the image data may be recorded as if the physical position of the transducer were different during three subsequent acquisitions as a result of the three apodization functions shown in FIG. 5. As a result, three resultant images may be similar, but the speckle patterns may be somewhat different. If the three images are then combined after the detection process (i.e., combined incoherently), then the speckle variance may be reduced, although possibly at the expense of lateral resolution. Partially coherent beamformation may be a form of retrospective spatial compounding, and provides similar benefits that are found in conventional spatial compounding.

Alternative embodiments may be possible. In the embodiments described above, the bias pattern is applied, the transmit-receive event is initiated and completed, and the next bias pattern is applied. Changing the bias pattern between the transmit and receive cycles may offer certain benefits. In an alternative embodiment, the bias patterns described above may be used during the receive cycle, but during the transmit cycle all bias lines may be turned on. In that embodiment, the transmitted field may be a plane wave, and may be identical for each transmit-receive cycle, but the receive bias group changes from event to event. Accordingly, a different delay may be used during beamformation, such as $t=\{[(x_m-x)^2+z^2]^{(1/2)}+z\}/c_0$, where $c_0$ is the speed of sound and the resultant beamformation may be considered a one-way, receive-only beamformation. The round-trip beamformation may have better lateral resolution, but may not be as strong in terms of SNR. In addition, such one-way techniques allow the use of aperture encoding schemes such as Hadamard encoding, which may provide further SNR benefit and is illustrated below with respect to FIGS. 7 and 8.

Figure 6:
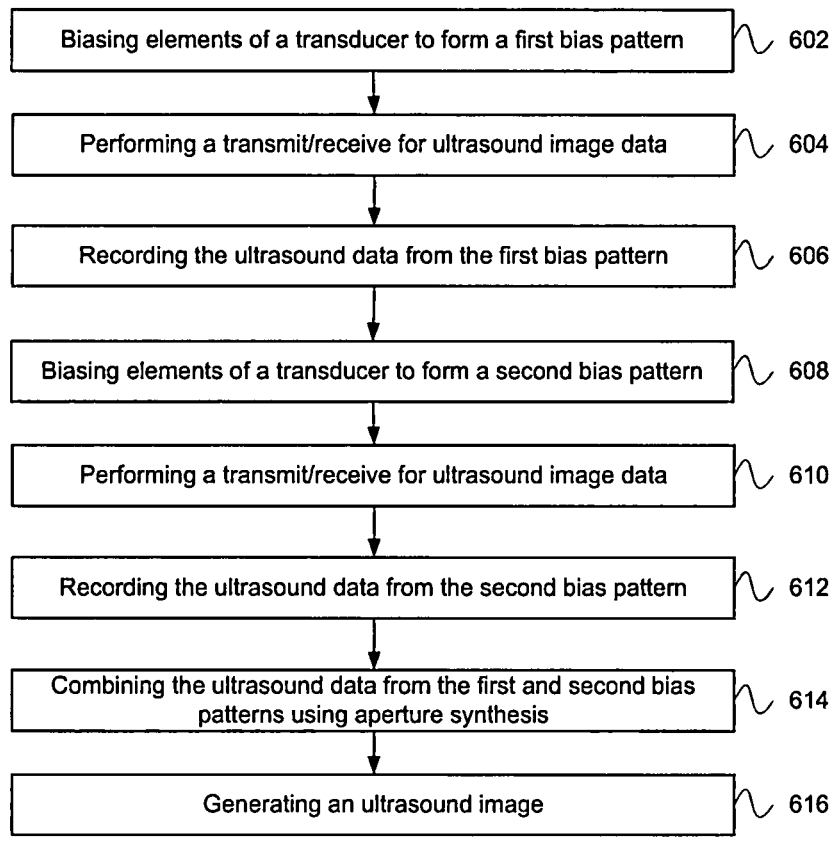
FIG. 6 is a flow chart diagram of one embodiment of a method of ultrasound imaging with a bias.

FIG. 6 is a flow chart diagram of one embodiment of ultrasound imaging with bias patterns as described above. In block 602, elements of a transducer, such as elements of a cMUT, are biased according to a first bias pattern. Examples of bias patterns were described above in FIGS. 3 and 4. Based on the first bias pattern, a transmit/receive function is performed to gather ultrasound image data as in block 604. That ultrasound image data may be recorded or saved for further processing as in block 606. In block 608, the bias pattern is adjusted and elements from the transducer are biased according to a second bias pattern. In block 610, a transmit/receive function is performed to gather ultrasound image data based on the second bias pattern. That second set of ultrasound image data may be recorded or saved for further processing as in block 612. In block 614, the ultrasound image data from the first bias pattern and from the second pattern may be combined using aperture synthesis. For example, each set of data is beamformed along the array of elements in the biased on row or rows of elements by electronic focus (e.g., beamformed in azimuth). Along the direction of synthesis (e.g., elevation), focusing is not provided. The beamformed samples from multiple acquisitions are combined by synthesis, such as beamforming, along the direction of synthesis (e.g., select azimuth beamformed samples associated with the desired delay in elevation and sum). In other words, the signals are combined in such a way that an aperture is synthesized and the data is beamformed or focused. The combined ultrasound data is used to generate an ultrasound image that is a composite of each of the transmit/receive events as in block 616.

Alternative embodiments may be available for the embodiments described above. In the above examples, the bias pattern is applied, the transmit-receive event initiated and completed, and the next bias pattern is applied. Changing the bias pattern between the transmit and receive cycles may be beneficial. In one embodiment, the bias patterns described above may be used during the receive cycle, but during the transmit cycle all M bias lines are turned on. In that embodiment, the transmitted field is a plane wave, and may be identical for each transmit-receive cycle. The receive bias group changes from event to event. A different delay may be used during beamformation:

$$t = \{[(x_m - x)^2 + z^2]^{(1/2)} + z\}/c_0.$$

The resultant beamformation may be referred to as a one-way, receive-only form of beamformation. That beamformation may be less than optimal in terms of lateral resolution compared with the above-described round-trip beamformation, but it may be more optimal in terms of SNR. An alternative embodiment, may be to switch the roles of transmit and receive. In other words, the different bias patterns are applied during the transmit cycle, and all elements are biased on during receive. The resultant beamformation is also a one-way form of beamformation, but may be referred to as transmit-only.

With either the receive-only or transmit-only technique, it may be desirable to bias on only a portion of the transmit (or receive) aperture instead of the entire aperture. For example, in the receive-only technique, the entire transmit aperture is biased on. It may be desirable to reduce the width of the biased-on portion of the aperture to reduce the width of the transmit plane-wave and therefore reduce sidelobes and image clutter. The resultant image may be more narrow, but the active aperture may then be shifted.

Figure 7:
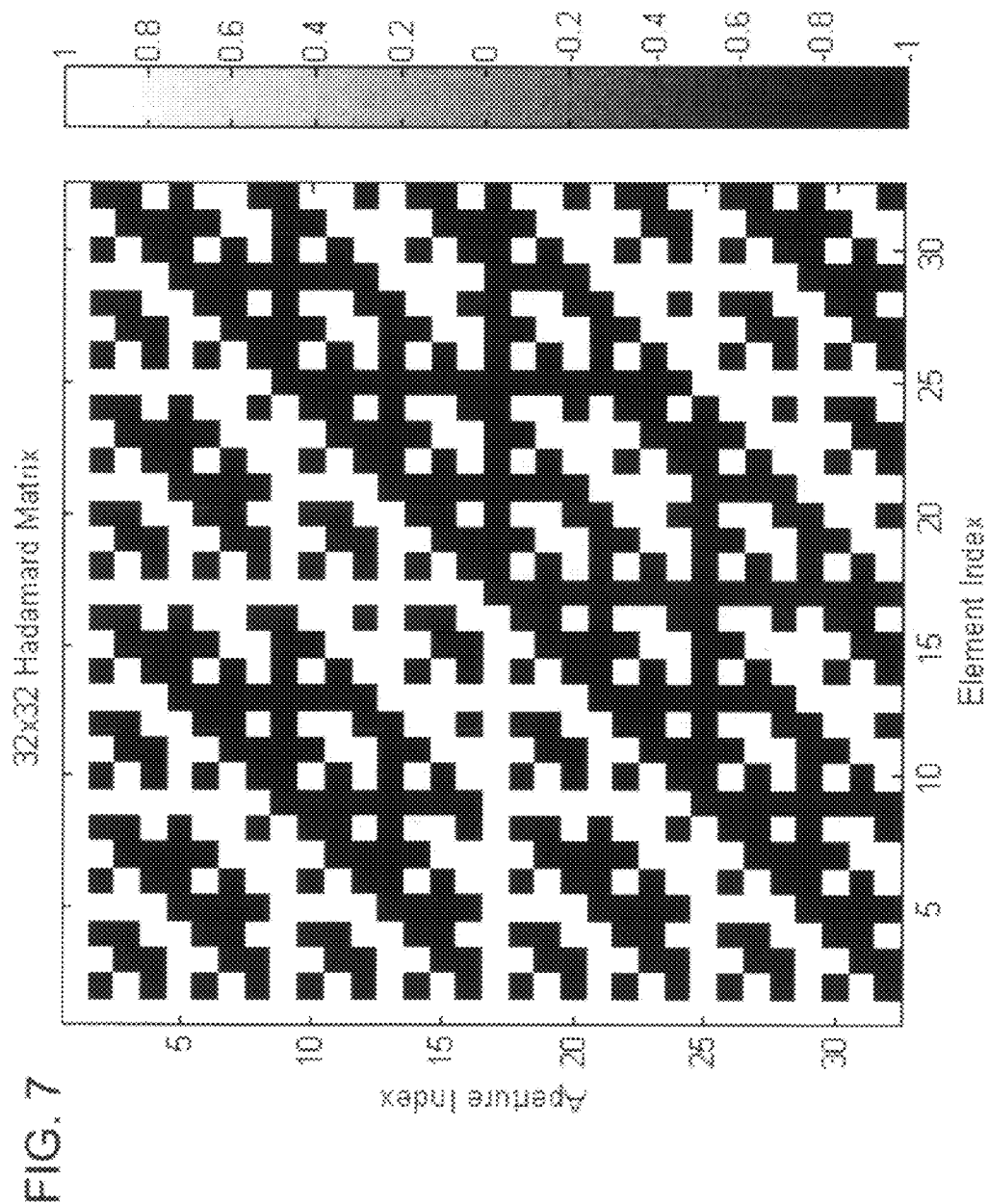
FIG. 7 is a graphical representation of an alternative embodiment of a bias pattern.

Further SNR benefit may be achieved with the use of aperture encoding schemes such as Hadamard encoding. In Hadamard encoding, a sequence of broad, coded patterns is applied. Consider the set of bias patterns shown in FIG. 3, where each bias pattern consists of all bias lines off except a single line that's biased on. If a Hadamard-encoded bias pattern is applied as shown in FIG. 7, and operate on the resultant data set with a linear algebraic decoding operation, the resultant decoded dataset is similar to that which would be acquired using the bias patterns of FIG. 3, except the SNR may be greater by $20*\log(\sqrt{N})$, where N is the total number of bias lines.

Figure 8:
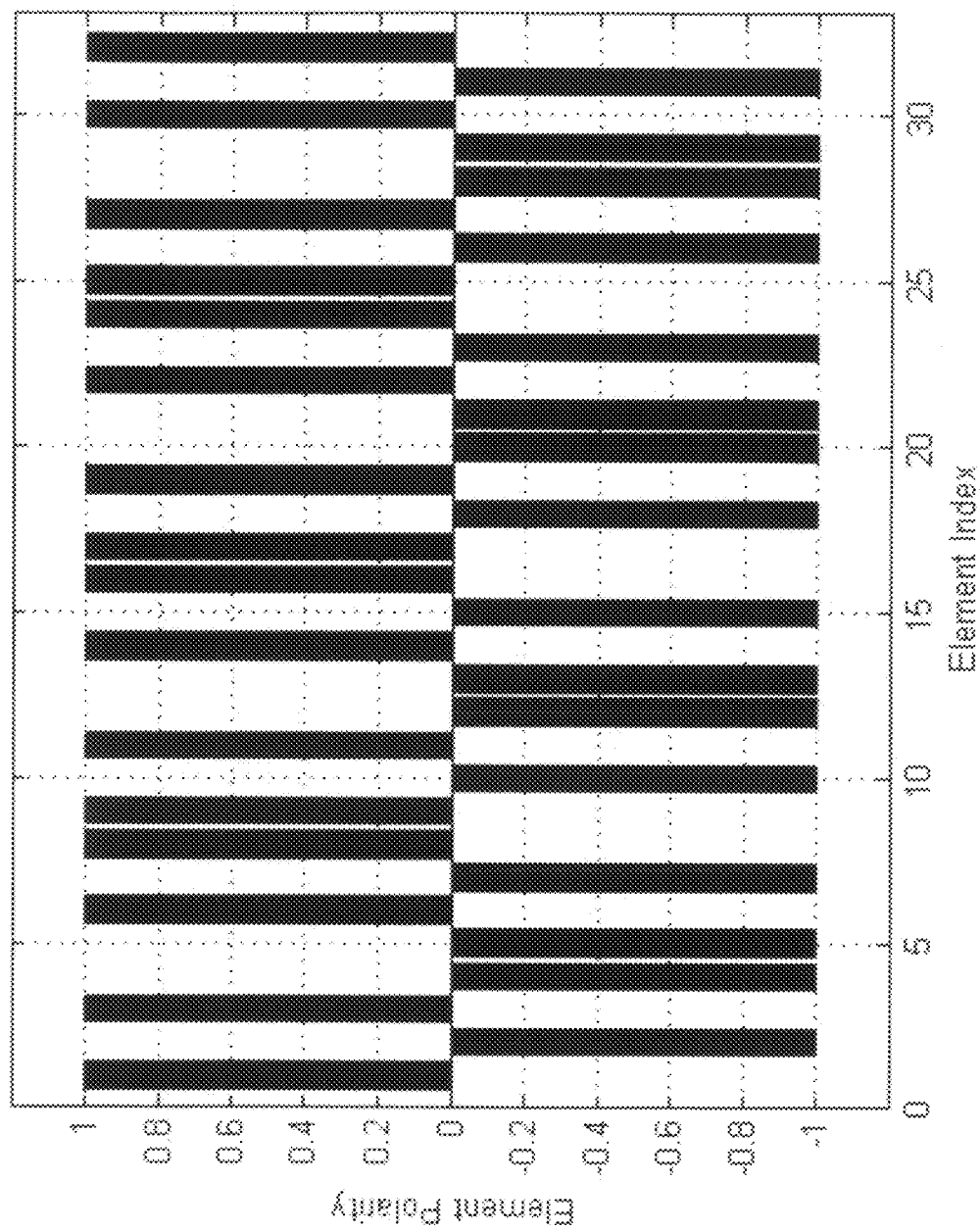
FIG. 8 is a graphical representation of a bias pattern in FIG. 7.

The points in a Hadamard matrix may be nonzero with the same magnitude but different in sign (element polarity). An example is shown in FIG. 8, which represents the bias pattern associated with the 6th tx/rx event of the bias pattern set shown in FIG. 7. Note that all bias lines are nonzero, but are biased to a value of either +v or −v, where v is the magnitude of the bias voltage. The bias pattern in FIG. 7 is viable for linear transduction schemes for which a reversal of the bias voltage results in a reversal of the transmitted signal. Alternatively, with transducers that make use of a less linear form of transduction a modified technique may be used. In this modified technique, each tx/rx event is split into two separate tx/rx events, each of which makes use of bias voltages of the same sign. For example, the bias pattern shown in FIG. 8, which is the 6th bias pattern in the set shown in FIG. 7. We may execute this bias pattern in two steps. In the first step, the positive bias voltage portion of the set is turned on, and the rest are left unbiased. The system is then triggered to perform a tx/rx event. The bias pattern is then switched and only the negative voltage component of the bias pattern is applied, but is applied as positive voltages. The system is triggered to perform a tx/rx event and the result of the two events may be subtracted.

In the bias patterns shown in FIGS. 3 and 4, $N_{skip}$ is a parameter that may influence grating lobe performance. Larger values of $N_{skip}$ may be associated with faster acquisitions, but higher grating lobes and therefore worse clutter performance. As shown in FIGS. 3 and 4, $N_{skip}$ may be limited to integer values. For transducers with coarse pitch, it may be desirable to use values of $N_{skip}$ that are less than one. This is possible with the use of apodization in the bias patterns. To enable apodization of the bias patterns, a bias generator that is capable of generating a number of different bias voltages may be used. $N_{skip}$ is a measure of how much the bias pattern translates between tx/rx events.

Figure 9:
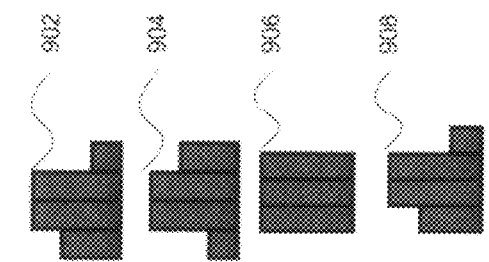
FIG. 9 is an illustration of a bias pattern from a group of elements.

FIG. 9 is an illustration of a bias pattern from a group of elements. FIG. 9 makes use of three different nonzero bias voltages (⅓, ⅔, 1). From the standpoint of the acoustics, the location of the bias pattern is the "center-of-mass" of the group of elements that's biased on. A center-of-mass calculation reveals that the center of mass of these bias groups shifts by an amount $N_{skip}=⅓$ from bias group to bias group. In other words, the first bias group 902 has a center of mass that is shifted by ⅓ to the second bias group 904. The second bias group 904 has a center of mass that is shifted by ⅓ to the third bias group 906. The third bias group 906 has a center of mass that is shifted by ⅓ to the fourth bias group 908.

Figure 10:
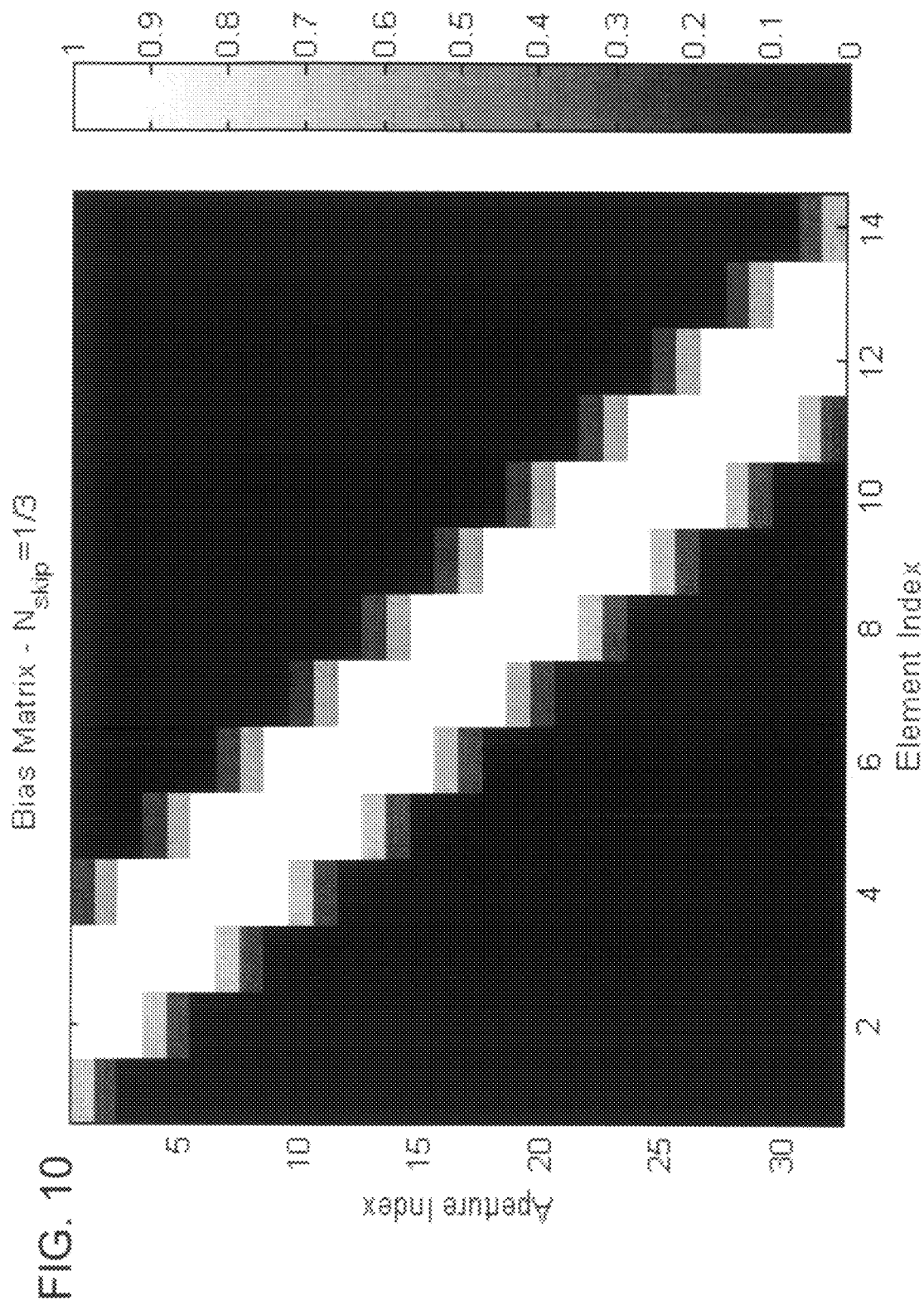
FIG. 10 is a graphical representation of a bias pattern in FIG. 9.

FIG. 10 is a graphical representation of the bias pattern in FIG. 9. In particular, FIG. 10 illustrates a set of bias patterns that were illustrated in FIG. 9. The images formed from such a bias set as shown in FIG. 10 may tend to be less prone to grating lobe artifacts.

Although aperture synthesis may be performed in elevation and traditional beam forming in azimuth, it may be possible to form a volumetric image by doing aperture synthesis in both dimensions. Standard walking bias patterns or Hadamard codes may be applied in elevation, and fixed focus time delay beam forming may be done in azimuth on both transmit and receive, where the transmit and receive foci are placed at the same depth. Receive data is then collected and stored for a multitude of transmit-receive events electronically translated to trace out a volume. Then an aperture may be synthesized in elevation through delay and sum of waveforms based on the distance between the center of the bias pattern and the intended focus in the elevation-range plane. Simultaneously, or subsequently, an aperture is synthesized in azimuth by assuming "virtual point sources" at the fixed focus, and carrying out delay and sum of waveforms based on the distance between these virtual points and the intended focus in the azimuth-range plane. For example, a method for volumetric ultrasound imaging may include a multidimensional acoustic transducer responsive to bias transduction, where a first bias pattern is applied in elevation and a first transmit-receive event occurs. For transmit, alternating signals with one set of fixed time delays are applied in azimuth, and for receive, alternating signals in azimuth are beam formed with another set of fixed time delays that do not vary dynamically in time. A second bias pattern may then be applied in elevation and a second transmit-receive event is carried out. Waveforms from the first and second events are combined "off-line" in a way that simultaneously synthesizes an aperture in both elevation and azimuth, or that first synthesizes an aperture in elevation then in azimuth, or vice versa.

As described, the aperture synthesis may be done with a "V3" style cMUT 2D array, where bias is fixed in elevation, and time delay transmit/receive beam forming is fixed in azimuth. In alternate embodiments, other aperture synthesis techniques may be utilized that are applicable to "SV3" style rotating aperture transducers, where the time delay is applied in elevation and the bias pattern is applied in azimuth on transmit, and the bias pattern is applied in elevation and the time delay applied in azimuth on receive. For example, a method for volumetric ultrasound imaging may include a 2D transducer responsive to bias transduction that is operated in aperture rotation mode (e.g., as described in "ULTRASOUND IMAGING TRANSDUCER ARRAY FOR SYNTHETIC APERTURE," U.S. Pat. Pub. 2007/0167752, the entire disclosure of which is hereby incorporated by reference). Two transmit-receive events are acquired using a first and a second transmit time delay profile in elevation, and then the receive waveforms from the two events are combined in a way that implements aperture synthesis, matching filtering, and/or dynamic transmit focusing in elevation.

Elevation aperture synthesis techniques in non-rotating aperture mode may have good isotropic 3D resolution, but less than ideal SNR. Rotating aperture mode imaging also has isotropic 3D resolution, but may not image in the near-field due to non-zero electronic switching times. A combination of these two modes may achieve a total-field imaging solution. For example, a method for volumetric ultrasound imaging may include constructing a volume from a combination of a first set of elevation aperture synthesis data taken with the transducer operating in non-rotating aperture mode, and a second set of data taken with the transducer operating in rotating aperture mode, where the second set may or may not involve aperture synthesis. The data from the two sets may be combined coherently or incoherently, compounded, stitched, interleaved, or laid side-by-side or top-to-bottom When a transducer aperture is smaller than the footprint or area of the volume to be imaged or interrogated, then it may be necessary to combine aperture synthesis with mechanical translation and stitching to cover the entire volume. For example, a method for volumetric ultrasound imaging may include constructing a volume from a first and second set of elevation aperture synthesis data taken with the transducer operating in non-rotating aperture mode, and where the transducer is mechanically translated or shifted in elevation or azimuth between the acquisition of the first and second sets. The data from the two sets may be stitched together in a coherent, incoherent or partially coherent fashion.

Referring back to FIG. 1, the detector 106 is a B-mode, Doppler, flow and/or other detector for identifying intensity, energy, velocity or other information from the beamformer signals. The ultrasound data may be any one of B-mode, Doppler velocity information, or Doppler energy information.

The system 100 may contain an optional scan converter (not shown) that converts from the acoustic grid to a Cartesian coordinate grid, such as associated with the display 24. In embodiments where some data is formatted in a Cartesian coordinate system, a scan converter converts some data from the acoustic grid to the Cartesian coordinate grid. For example, a scan-converter scan-converts a plurality of two-dimensional images or planes from an acoustic grid to a Cartesian coordinate grid. Alternatively, a scan converter, CPU, GPU or other processor converts some or all of the acoustic grid data to a 3D Cartesian grid.

The memory 110 may comprise a video random access memory, a random access memory, or other memory device for storing data or video information. The memory 110 may be a computer-readable storage media or memory, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system.

In one embodiment, the memory 110 comprises a video random access memory of the processor 108. In alternative embodiments, the memory 110 is separate from the processor 108, such as a cache memory of a processor, the system memory or other memory. The memory 110 is operable to store ultrasound data formatted in an acoustic grid, a Cartesian grid, both a Cartesian coordinate grid and an acoustic grid, or ultrasound data representing a volume in a 3D grid.

In one embodiment, the processor 108 may be a GPU which comprises a graphics accelerator chip, processor, applications specific integrated circuit, circuit, or accelerator card. In a second embodiment, the processor 108 is a personal computer graphics accelerator card or components, such as manufactured by nVidia (e.g. Quadro4 900XGL or others), ATI (e.g. Radeon 9700 or others), or Matrox (e.g. Parhelia or others). The processor 108 provides hardware devices for accelerating the volume rendering processes, such as using application programming interfaces for three-dimensional texture mapping. Example APIs include OpenGL and DirectX, but other APIs may be used independent of or with the processor 108.

The processor 108 and/or the memory 110 may be included within the system 100 as part of a single ultrasound system component, such as an ultrasound system on a cart in a same housing. In alternative embodiments, the processor 108 and memory 110 are provided separate from an ultrasound data acquisition system, such as provided in a workstation or personal computer. The ultrasound data may be transferred wirelessly, over a computer network or through a transferable storage medium to the processor 108.

The display 24 is a CRT, LCD, flat panel, plasma screen, video projector or other device for displaying a two-dimensional image of a three-dimensional volume or representation. The display 24 may be configured to display the output of an ultrasound image.

Figure 11:
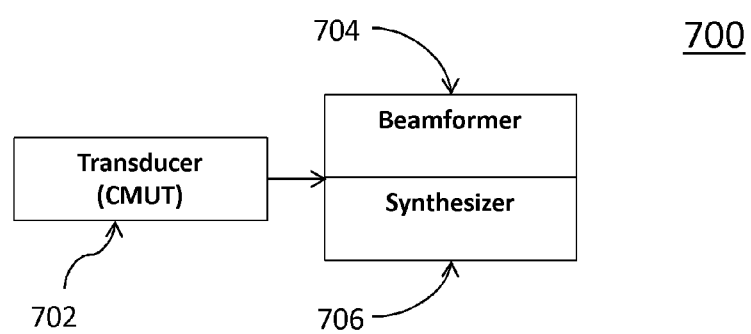
FIG. 11 is a diagram of another embodiment of a system for ultrasound imaging.

FIG. 11 shows another embodiment of a system 700 for generating images from ultrasound data. The ultrasound system 700 includes a transducer 702, a beamformer 704, and a synthesizer 706. The transducer 702 includes elements that are activated by a bias voltage. The beamformer 704 is coupled with the transducer 702 and is operable to perform transmit and receive functions. The synthesizer 706 is also coupled with the transducer 702. The synthesizer 706 is operable to perform aperture synthesis, as described herein, on the transmit and receive functions.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A system for volumetric ultrasound imaging comprising:
    a transducer comprising elements biased on by a bias voltage;
    a bias generator coupled with the transducer, the bias generator operable to generate a bias signal establishing a first bias pattern of the elements and generate a bias signal for establishing a second bias pattern of the elements; and
    a beamformer coupled with the transducer, the transducer operable to, in response to the beamformer, transmit and receive ultrasound data based on the first bias pattern and transmit and receive ultrasound data based on the second bias pattern, the beamformer configured to receive beamform along a first direction of a scanned volume and synthesize, on receive, an aperture along a second direction of the scanned volume, wherein the second direction is different than the first direction and the receive beamforming is different than the synthesizing;
    wherein an image is generated based on a combination of the ultrasound data from the first bias pattern and the ultrasound data from the second bias pattern, the combination being from the synthesis of the aperture along the second direction.

2. The system of claim 1 wherein the receive beamformer being configure to receive beamform comprises the receive beamformer being configured to receive beamform in an azimuth direction and the first and second bias patterns vary in an elevation direction.

3. The system of claim 1 wherein the aperture synthesis comprises Hadamard encoding.

4. The system of claim 1 wherein the transducer comprises at least one of a capacitive membrane ultrasound transducer (cMUT) or an electrostrictive transduction material, that comprises the elements that are activated by the bias voltage.

5. The system of claim 1 wherein the first and second patterns are apodized or are used for the transmission and reception with an effective width greater than or equal to a skip size between the bias patterns.

6. A method for ultrasound imaging with an ultrasound transducer responsive to a bias for transduction, the method comprising:
    beamforming received data along a first direction of a scanned volume, the beamforming focusing first acoustic energy in the first direction and not focusing in a second direction, wherein the second direction is different than the first direction;
    transmitting, in the beamforming, second acoustic energy from the ultrasound transducer, responsive to the bias for transduction with a first bias pattern and with a second bias pattern;
    receiving, with the ultrasound transducer and in response to the transmitting, the first acoustic energy from the first bias pattern and from the second bias pattern;
    synthesizing an aperture along the second direction of the scanned volume, the synthesizing forming the aperture by focusing, in the second direction, the received data from multiple acquisitions created by the beamforming along the first direction; and
    combining, based on the synthesized aperture, a signal resulting from the transmitting and receiving with the first bias pattern with a signal resulting from the transmitting and receiving with the second bias pattern.

7. The method of claim 6 wherein the ultrasound transducer responsive to a bias for transduction comprises a plurality of elements, further wherein the first bias pattern corresponds to a first pattern of elements that are biased on.

8. The method of claim 7 wherein the second bias pattern corresponds to a second pattern of elements that biased on.

9. The method of claim 8 wherein the elements that are biased on in the first bias pattern and the elements that are biased on in the second bias pattern are varied in an elevation direction.

10. The method of claim 8 wherein the first bias pattern includes elements in the azimuth direction that are biased on that are not biased on in the second bias pattern.

11. The method of claim 6 wherein the ultrasound transducer responsive to a bias for transduction comprises at least one of a capacitive membrane ultrasound transducer (cMUT) or an electrostrictive material.

12. The method of claim 6 wherein the receiving comprises receiving with a third bias pattern by the ultrasound transducer.

13. The method of claim 6 wherein the first and second bias patterns each have an effective width greater than or equal to a skip size between the first and second bias patterns.

14. The method of claim 6 wherein the aperture synthesis comprises at least one of a delay and sum beam formation, a phase-shifting, matched or inverse lateral filtering.

15. The method of claim 6 wherein transmitting comprises:
    activating the first bias pattern on the ultrasound transducer; and
    applying a first time delay pattern to the second acoustic energy from the application of the first bias pattern; and
    wherein receiving comprises:
    applying the second bias pattern to the ultrasound transducer; and
    applying a second time delay pattern to the first acoustic energy from the ultrasound transducer from the application of the second bias pattern.

16. The method of claim 6 further comprising:
    repeating the transmitting and receiving along a plurality of scan lines in a volume; and
    generating a representation of the volume.

17. A method for ultrasound imaging using an electrostrictive material responsive to biasing comprising:
    beamforming first and second ultrasound image data along a first direction of a scanned volume, the beamforming focusing first and second signals along the first direction and not focusing along a second direction, wherein the second direction is different than the first direction;

activating a first bias pattern of elements on the electrostrictive material;

transmitting first acoustic energy and receiving the first signals, in the beamforming, with the first bias pattern;

activating a second bias pattern of elements on the electrostrictive material;

transmitting second acoustic energy and receiving the second signals, in the beamforming, with the second bias pattern;

synthesizing an aperture along a second direction of the scanned volume, the synthesizing forming the aperture by focusing in the second direction from the first and second ultrasound image data created from the beamforming in the first direction;

combining, in the synthesizing, the first ultrasound image data and the second ultrasound image data from the synthesized aperture; and forming an image as a function of the combination.

18. The method of claim 17 wherein the first bias pattern and the second bias pattern are in an elevation direction.

19. The method of claim 17 wherein the electrostrictive material comprises a capacitive membrane or microfabricated ultrasound transducer (cMUT).

20. The method of claim 17 wherein the activating the first bias pattern of elements comprises biasing on the first pattern of elements.

21. A system for volumetric ultrasound imaging comprising:

a transducer including elements that are activated by a bias voltage;

a beamformer coupled with the transducer, the beamformer operable to perform transmit and receive functions along a first dimension;

a synthesizer coupled with the transducer, the synthesizer operable to perform aperture synthesis on the transmit and receive functions along a second dimension different than the first dimension;

wherein the beamformer is configured to perform a first transmit and receive function on elements that are biased according to a first bias pattern and a second transmit and receive function is performed on elements that are biased according to a second bias pattern.

22. The system of claim 21 wherein the synthesizer generates an ultrasound image based on the aperture synthesis on the transmit and receive functions.

* * * * *